United States Patent [19]

Collot et al.

[11] Patent Number: 5,047,905
[45] Date of Patent: Sep. 10, 1991

[54] MOTOR VEHICLE HEADLIGHT INCLUDING AN INDICATOR DEVICE FOR INDICATING THE ELEVATION DIRECTION OF ITS REFLECTOR

[75] Inventors: Patrice Collot, Pantin; Jean-Marie Brel, Claye-Souilly, both of France

[73] Assignee: Valeo Vision, Bobigny Cedex, France

[21] Appl. No.: 657,441

[22] Filed: Feb. 19, 1991

[30] Foreign Application Priority Data

Feb. 20, 1990 [FR] France ............................. 90 02027

[51] Int. Cl.5 .............................................. F21M 3/18
[52] U.S. Cl. ...................................... 362/66; 362/287; 362/427; 33/335; 33/379
[58] Field of Search ....................... 362/61, 60, 80, 287, 362/418, 427, 428; 33/335, 365, 370, 379

[56] References Cited

U.S. PATENT DOCUMENTS

| | | | |
|---|---|---|---|
| 1,609,634 | 12/1926 | Ryan | 33/370 |
| 2,058,743 | 10/1936 | Trippe | 362/311 |
| 3,612,854 | 10/1971 | Todd et al. | 362/269 |
| 4,660,128 | 4/1987 | Bergin et al. | 362/80 |
| 4,794,495 | 12/1988 | McMahan et al. | 362/66 |
| 4,802,067 | 1/1989 | Ryder et al. | 362/61 |
| 4,916,583 | 4/1990 | Nagasawa | 362/428 |
| 4,984,136 | 1/1991 | Yamagishi et al. | 362/66 |

Primary Examiner—Ira S. Lazarus
Assistant Examiner—Richard R. Cole

[57] ABSTRACT

A motor vehicle headlight comprising a light source, a reflector, a housing, and a front glass, and also comprising an indicator device for indicating the elevation direction of the reflector, the indicator device being of the type comprising a spirit level mounted on the reflector in a plane which is essentially vertical and parallel to the optical axis defined by the reflector, and the spirit level occupying a predetermined angular relationship with the optical axis. The spirit level is mounted on a support suitable for being removably and temporarily installed in a lamp hole provided in the reflector, with the support then replacing the lamp.

2 Claims, 1 Drawing Sheet

MOTOR VEHICLE HEADLIGHT INCLUDING AN INDICATOR DEVICE FOR INDICATING THE ELEVATION DIRECTION OF ITS REFLECTOR

The present invention relates in general to adjusting the direction in which motor vehicle headlights point.

It relates more particularly to a headlight including an indicator device for indicating the elevation direction of its reflector for the purpose of bringing the optical axis defined by said reflector into a given plane, e.g. the horizontal plane, while performing adjustment operations.

BACKGROUND OF THE INVENTION

Japanese patent application published under the number 1-173 501 discloses a headlight in which a spirit level is used to indicate the direction in which the reflector is pointing relative to the horizontal for the purpose of performing elevation adjustment on the beam. The spirit level is mounted on a body capable of being removably disposed on the rear of the lamp base when the lamp is mounted in the reflector.

A drawback of this device lies in that the accuracy with which it indicates headlight direction depends on the accuracy with which the lamp is positioned in the hole for the lamp in the reflector. Thus, in the conventional case where very large clearance may exist between the reflector and the lamp, or where positioning reproducibility from one lamp to another is poor, particularly because of the manufacturing tolerances on lamp bases, the indication given is not of sufficient accuracy.

The present invention seeks to mitigate this drawback.

SUMMARY OF THE INVENTION

To this end, the present invention provides a motor vehicle headlight comprising a light source, a reflector, a housing, and a front glass, and also comprising an indicator device for indicating the elevation direction of the reflector, the indicator device being of the type comprising a spirit level mounted on said reflector in a plane which is essentially vertical and parallel to the optical axis defined by said reflector, and the spirit level occupying a predetermined angular relationship with said optical axis, wherein the spirit level is mounted on a support suitable for being removably and temporarily installed in a lamp hole provided in the reflector, said support replacing the lamp.

BRIEF DESCRIPTION OF THE DRAWING

An embodiment of the invention is described by way of example with reference to the accompanying drawing, in which.

MORE DETAILED DESCRIPTION

Figure 1:
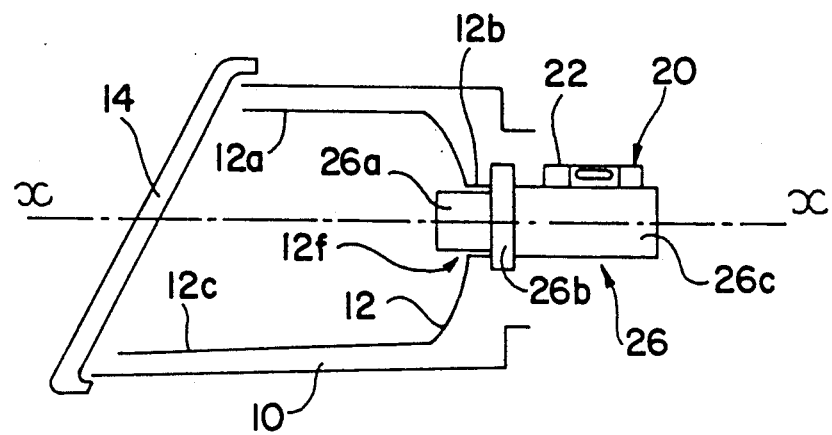
FIG. 1 is a diagrammatic axial vertical section view through a headlight fitted with an indicator device of the invention.

With reference initially to FIG. 1, a headlight comprises a housing 10, a reflector 12 situated inside the housing, and a glass 14 closing the front of the housing. A lamp (not shown) co-operates with the reflector to form a beam.

A spirit level 20 conventionally constituted by a transparent cylindrical tube 22 containing a liquid (not necessarily a spirit) and a bubble is mounted as explained in greater detail below on the reflector in such a manner that the axis of the tube 22 is in a well-defined angular relationship with an optical axis xx defined by said reflector. Specifically, the angular relationship may be accurate parallelism, but other relationships are also possible.

Means are also provided of entirely conventional design not described herein for the purpose of displacing the reflector 12 by pivoting it about a horizontal line extending essentially transversely to its optical axis, thereby varying the elevation angle of said optical axis and of the generated beam.

When it is desired to adjust the reference position of the reflector so as to bring its optical axis into a determined plane (horizontal in the present example) the means for displacing the reflector are actuated while observing the spirit level 20 until the spirit level indicates that the desired horizontal direction has been obtained.

According to an essential aspect of the invention, the spirit level 20 is mounted on a support 26 whose shape and size are such as to enable it to be applied temporarily in the lamp hole 12f through the reflector 12 and in a position which is well defined so that the spirit level 20 then occupies the desired angular relationship relative to the optical axis xx defined by the reflector. In this embodiment, it is therefore necessary to remove the lamp before performing the adjustment operation.

In order to ensure that the support 26 is suitably held relative to the reflector, the support 26 may include a cylindrical portion 26a penetrating into the lamp hole and an outwardly projecting thrust portion 26b against which the rear free end edge of the collar 12b around the lamp hole can be brought to bear. The spirit level 20 is then fixed on a portion of the support 26c which extends rearwards from the thrust portion 26b.

Naturally, the present invention is not limited to the embodiment described and shown, and the person skilled in the art will be able to make variations or modifications thereto without going beyond the scope of the following claims.

We claim:

1. A motor vehicle headlight comprising a light source, a reflector, a housing, and a front glass, and also comprising an indicator device for indicating the elevation direction of the reflector, the indicator device being of the type comprising a spirit level mounted on said reflector in a plane which is essentially vertical and parallel to the optical axis defined by said reflector, and the spirit level occupying a predetermined angular relationship with said optical axis, wherein the spirit level is mounted on a support suitable for being removably and temporarily installed in a lamp hole provided in the reflector, said support replacing the lamp.

2. A headlight according to claim 1, in which the support comprises a cylindrical portion suitable for engaging in the lamp hole, and an outwardly projecting thrust portion suitable for bearing against the rear edge of a collar provided on the reflector and surrounding the lamp hole.

* * * * *